United States Patent [19]

Eger et al.

[11] Patent Number: 5,719,357

[45] Date of Patent: Feb. 17, 1998

[54] BALANCE WITH SCALE ON TOP WITH A ONE-PIECE PARALLEL GUIDE

[75] Inventors: Matthias Eger, Wollbrandshausen; Heinz-Gerhard Köhn, Dransfeld; Werner Schulze, Göttingen, all of Germany

[73] Assignee: Sartorius AG, Göttingen, Germany

[21] Appl. No.: 503,480

[22] Filed: Jul. 18, 1995

[30] Foreign Application Priority Data

Jul. 30, 1994 [DE] Germany .................. 44 27 088.7

[51] Int. Cl.[6] ............................................. G01G 21/10
[52] U.S. Cl. ......................... 177/184; 177/244; 177/229
[58] Field of Search ................................ 177/184, 187, 177/188, 189, 238, 239, 240, 241, 210 EM, 229, 244, 212

[56] References Cited

U.S. PATENT DOCUMENTS

| | | | |
|---|---|---|---|
| 5,054,566 | 10/1991 | Freeman | 177/184 |
| 5,190,117 | 3/1993 | Freeman et al. | 177/244 |
| 5,205,369 | 4/1993 | Neeleman | 177/229 |
| 5,250,762 | 10/1993 | Gustafsson et al. | 177/244 |
| 5,459,289 | 10/1995 | Burkhard | 177/244 |

*Primary Examiner*—Michael L. Gellner
*Assistant Examiner*—Randy W. Gibson
*Attorney, Agent, or Firm*—Eric P. Schellin

[57] ABSTRACT

A lop loaded balance with a load receiver (1, 2, 3) connected by at least one upper (11) and at least one lower guide rod in the form of a parallel guide to a system carrier (4) fixed to the housing, which load receiver, guide rods and system carrier are manufactured from one piece. The system carrier (4, 5, 6, 7) is designed as a frame. The frame-like system carrier is completely surrounded by a second frame (14, 15, 16, 17) supported on the balance feet and that both frames are constructed in a one-piece manner and are connected to one another in such a manner that twistings of the one frame are transferred as little as possible onto the other frame.

8 Claims, 6 Drawing Sheets

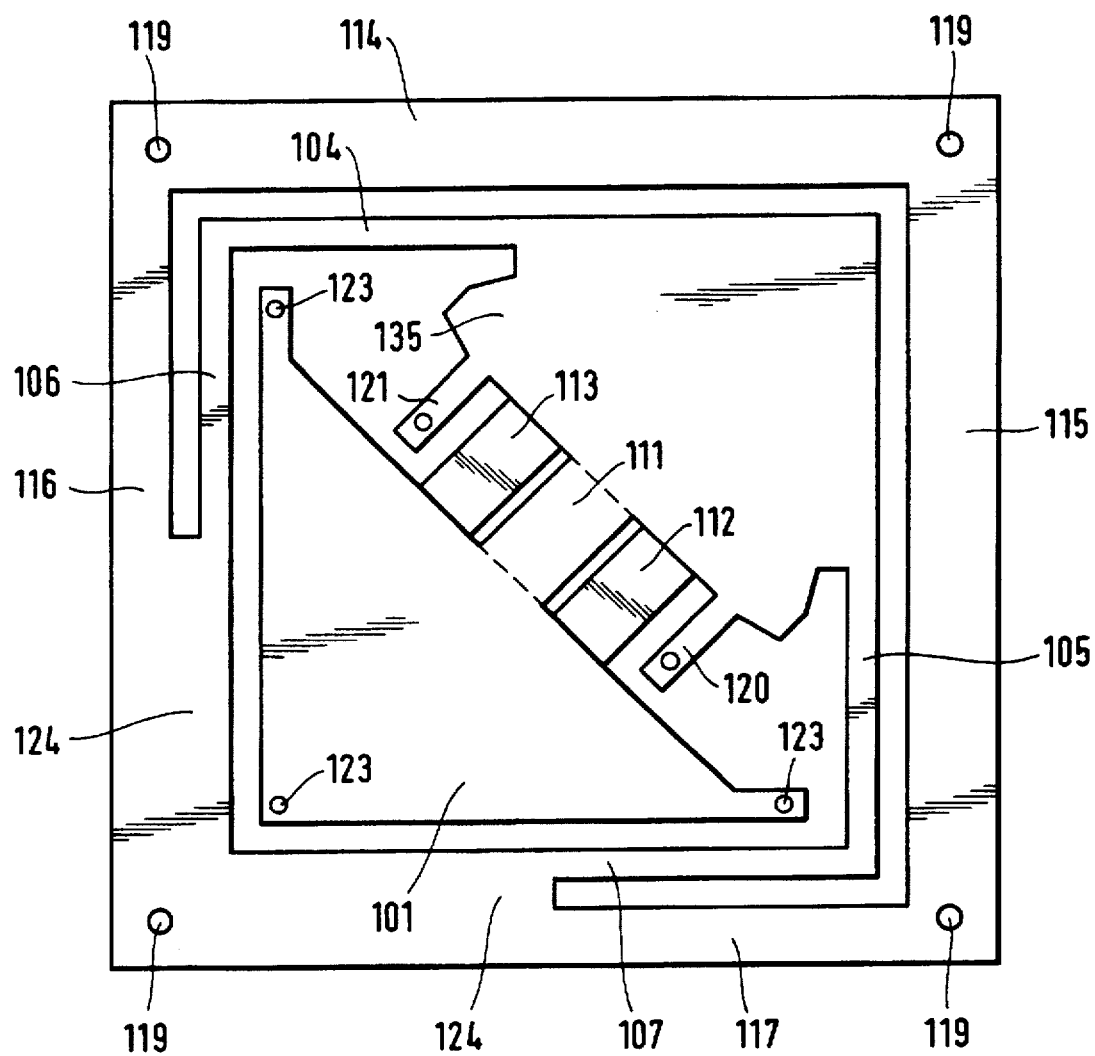

BALANCE WITH SCALE ON TOP WITH A ONE-PIECE PARALLEL GUIDE

BACKGROUND OF THE INVENTION

The invention relates to a toploaded balance with a load receiver connected by at least one upper and at least one lower guide rod in the form of a parallel guide to a system carrier fixed to the housing. The load receiver, guide rods and system carrier are manufactured from one piece.

Balances of this type are known e.g. from CH 353,555 or DE-OS 34 22 042.

The fastening of the one-piece parallel-guide block to the balance housing can readily cause twistings within the parallel-guide block which have reactive effects on the functioning of the balance in spite of their small magnitude. Likewise, twistings of the housing are transferred during the operation of the balance, e.g. if the balance is set up on an uneven or resilient location, onto the parallel-guide block. In order to circumvent these twisting problems, e.g. GE-GM 93 07 382 teaches the mounting of the parallel-guide block in an intermediate carrier which is U-shaped when viewed from above and teaches the connecting of only this intermediate carrier to the housing. However, this eliminates the advantage of the one-piece design.

The invention therefore has the problem of teaching a design for a balance with scale on top of the initially cited construction which can be readily manufactured in one piece and which avoids the reactive effect of the housing on the parallel-guide block.

SUMMARY OF THE INVENTION

The invention solves this problem in that the system carrier is designed like a frame, viewed from above, wherein the frame-like system carrier is completely surrounded by a second frame supported on the balance feet and that both frames are constructed in a one-piece manner and are connected to one another at least one location in such a manner that twistings of the one frame are transferred as little as possible onto the other frame.

The frame-like design results in high stability for the system carrier and for the second, surrounding frame and the connection of the two, which is low in reactive effects, produces only a slight coupling and the one-piece manufacture prevents twisting during assembly.

A design which is especially easy to manufacture results if the upper and the lower guide rod of the parallel guide are arranged so that they, when viewed from above, do not overlap one another. Then, the entire parallel guide including the two frames can be removed up/down from the mold e.g. in a diecasting process without slide bars. In a manufacture by wire-EDM electro-discharge machining, i.e. milling or extrusion, the parallel guide can be effectuated in this geometry by milling from above and below without undercuts.

The invention is described in the following using the schematic figures.

BRIEF DESCRIPTION OF THE INVENTION

The invention is described in the following using the schematic figures

FIG. 9 shows a top view of the balance in a seventh embodiment.

DETAILED DESCRIPTION OF THE INVENTION

Figure 1:
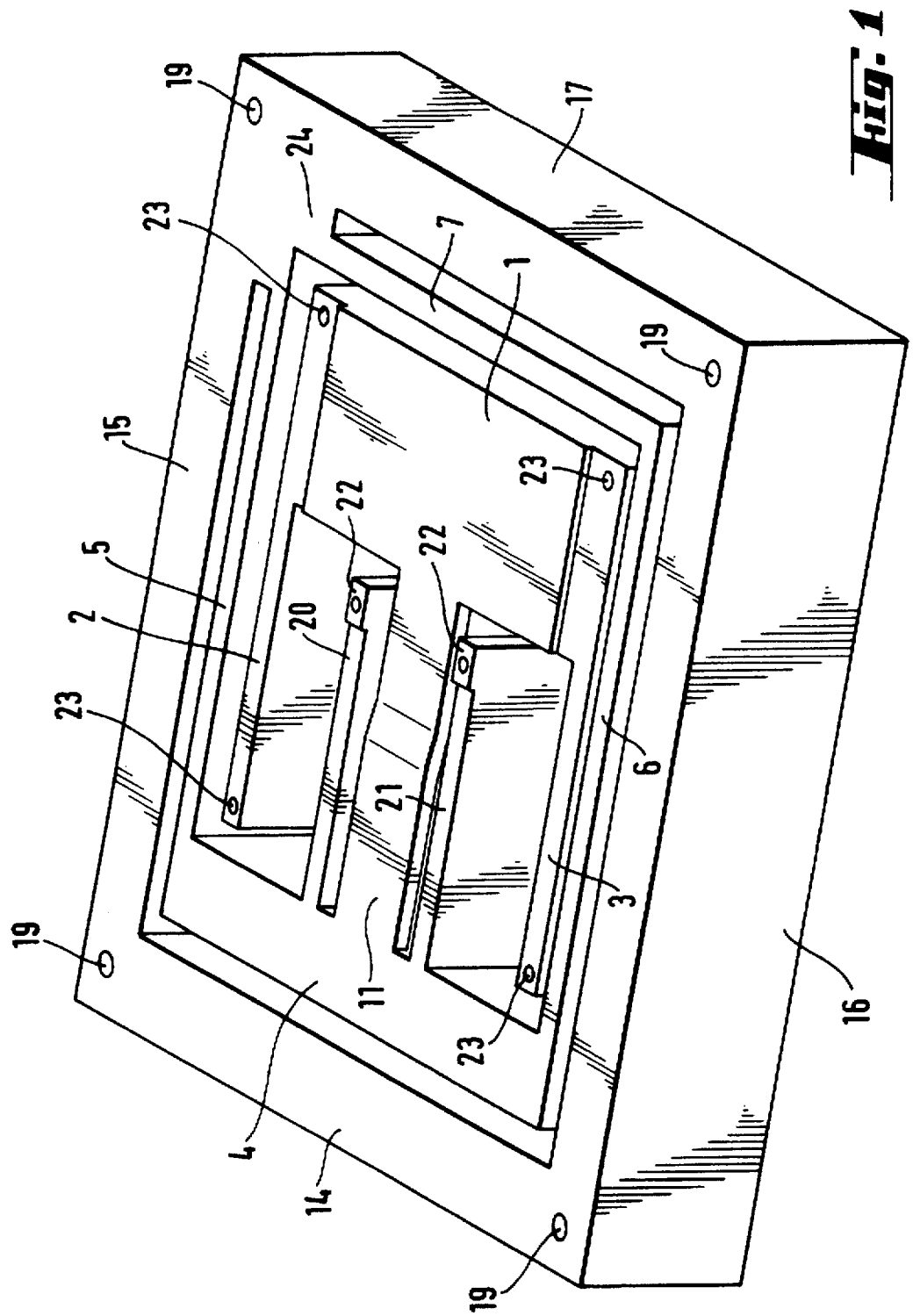
FIG. 1 shows a perspective view of the balance.
Figure 2:
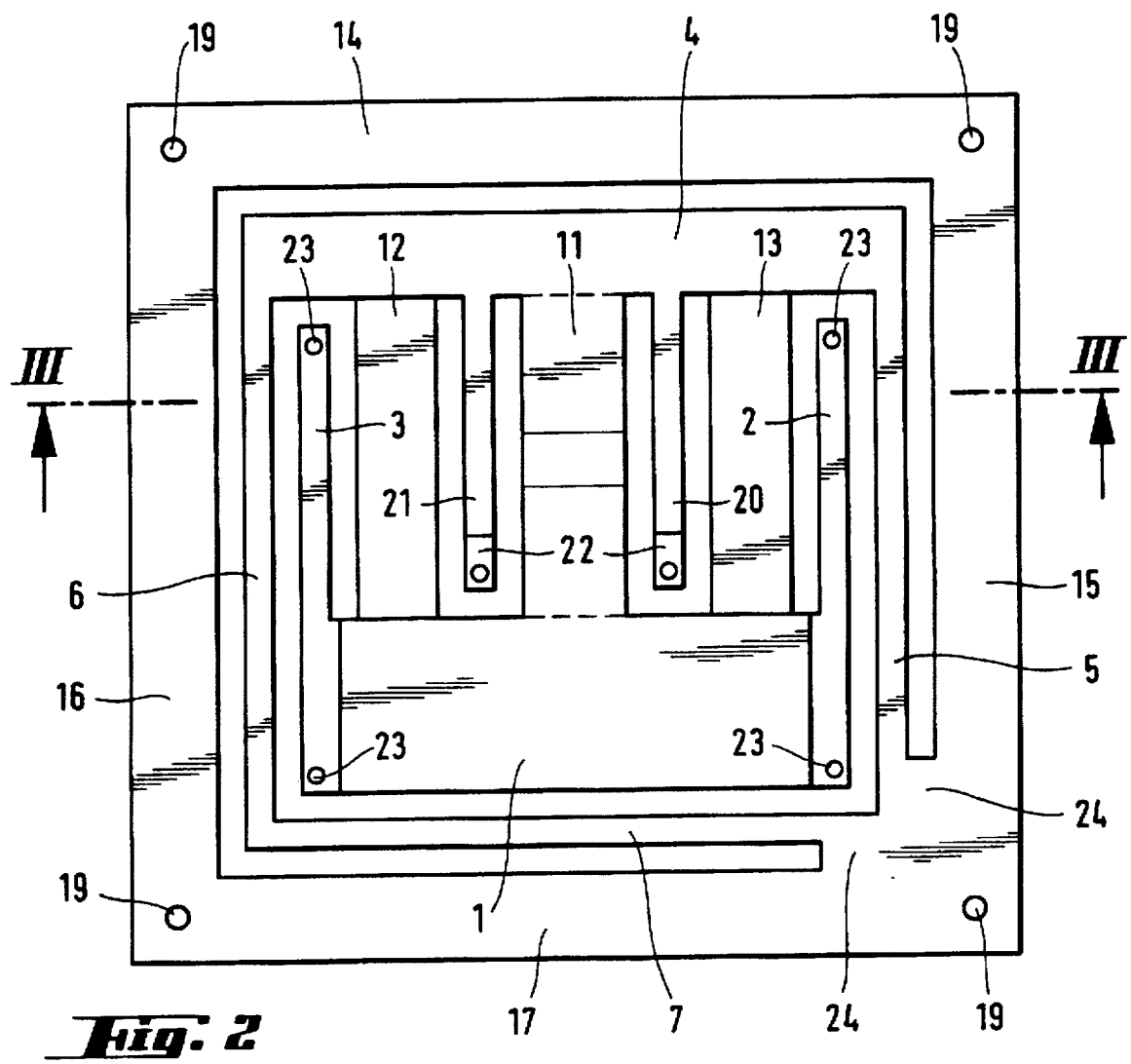
FIG. 2 shows a top view of the balance.
Figure 3:
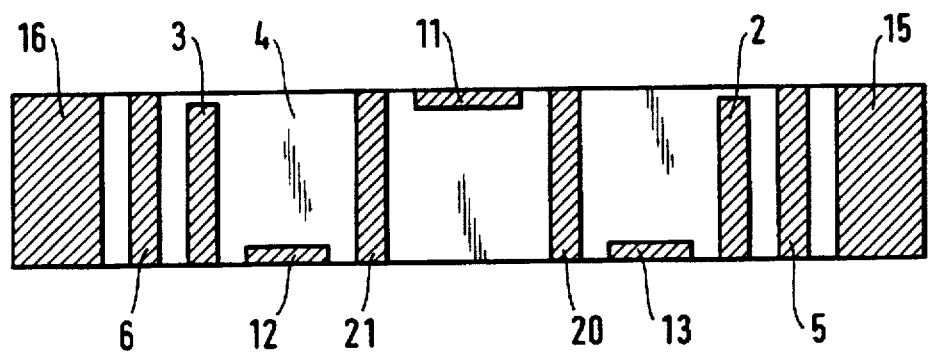
FIG. 3 shows a section through the balance along line III—III in FIG. 2.

A first embodiment of the balance is shown in FIGS. 1 to 3. FIG. 1 shows a perspective view, FIG. 2 a top view and FIG. 3 a section along line III—III in FIG. 2. Frame-like system carrier 4,5,6,7 can be seen, to which two lower guide rods 12,13 and broad upper guide rod 11 are connected. The ends of the guide rods merge into load receiver 1,2,3. Load receiver 1,2,3 has a total of four perforations 23 in which a balance scale (not shown) is supported. Guide rods 11,12,13 form a parallel guide in a known manner for load receiver 1,2,3. Frame-like system carrier 4,5,6,7 is connected in one corner via intermediate piece 24 to outer frame 14,15,16,17. Four perforations 19 for the balance feet (not shown) are present in outer frame 14,15,16,17. As a result of the rigid construction of the inner and of the outer frame and of the coupling only by intermediate piece 24. Twistings of the outer frame are virtually not transferable onto the inner frame. The entire part described above consists of a single piece. It can be manufactured e.g. as a diecasting part whose removal from the form takes place either upward or downward. Alternatively, a manufacture by wire-EDM is also possible, in which only the material above guide rods 12, 13 and below guide rod 11 must be removed by milling. The fact that guide rods 11,12,12, viewed from above, do not cover each other makes it possible to remove the diecasting part from the mold without problems and to mill without problems.

Furthermore, the one-piece balance body comprises two projections 20, 21 on frame side 4 of system carrier 4,5,6,7. These projections have elevated area 22 with a threaded bore on the end. An electrode of a capacitive path scanning fastened to the system carrier can be fastened to these threaded bores. The other electrode of the capacitive path scanning, which electrode is variable under load, is fastened to surface 1 of the load receiver or is formed directly by surface 1 of the load receiver. In this manner the load-dependent bending of guide rods 11, 12 and 13 can be converted in a known manner into an electric signal. Naturally, other methods of path scanning are also possible; likewise, the load-dependent bending of the guide rods can be measured by adhered thereunto wire strain gauges.

Figure 4:
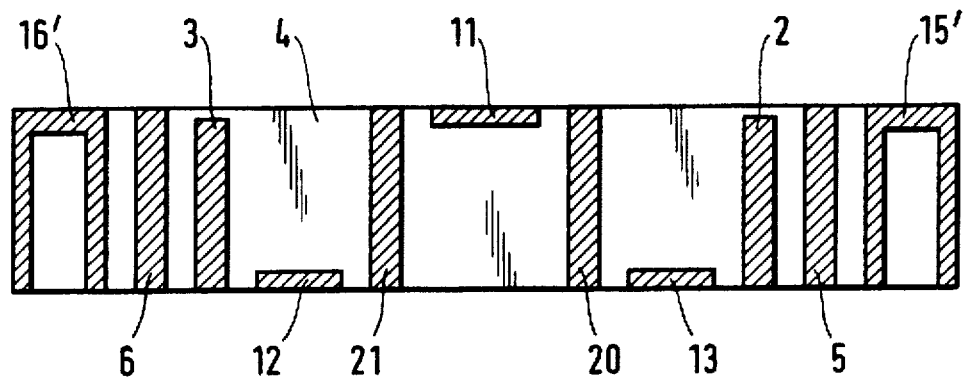
FIG. 4 shows a section through the balance in a second embodiment.

FIG. 4 shows a second embodiment of the balance in section. In this embodiment outer frame 14', 15', 16', 17' is not designed to be massive but rather exhibits a downwardly open U-shaped profile. This makes the frame lighter without reducing the stability to any great extent. The U-shaped profile is purposefully reinforced by ribs. In the same manner, inner frame 4,5,6,7 can also be designed as a U profile (not shown).

Figure 5:
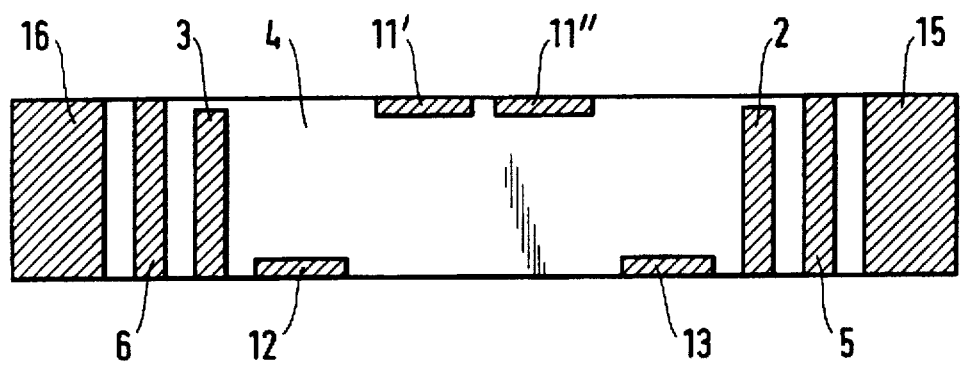
FIG. 5 Shows a section through the balance in a third embodiment.

FIG. 5 shows a third embodiment of the balance in section in which both the lower guide rod is divided into two partial guide rods 12, 13 and the upper guide rod into two partial guide rods 11', 11". This embodiment results in a greater symmetry vis-à-vis the various forces and moments which occur.

Figure 6:
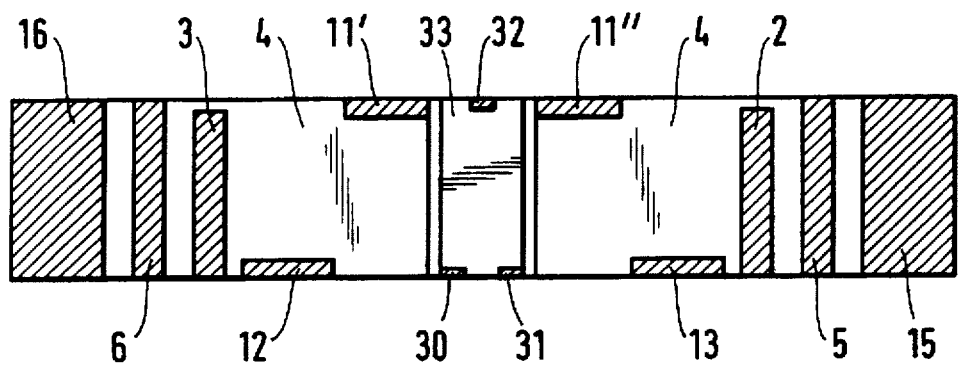
FIG. 6 shows a section through the balance in a fourth embodiment.

FIG. 6 shows a fourth embodiment of the balance in section. This embodiment utilizes the reduction of force by means of two resilient parallel guides, as is known from DE-OS 44 01 412. A first parallel guide consisting of guide rods 11', 11" and 12, 13 connects the load receiver in a resilient manner to the system carrier and a second parallel guide consisting of guide rods 30, 31 and 32 connects the load receiver to intermediate piece 33 which is connected via a practically pathless force measuring system, e.g. an oscillating string or an electromagnetic compensation of force, to system carrier 4. This force measuring system then only has to receive a force reduced by the ratio of the elasticity constant of guide rods 30, 31, 32 on the one hand to the elasticity constant of guide rods 11', 11", 12, 13 on the other hand. All guide rods are again arranged in such a manner that no overlapping occurs.

Figure 7:
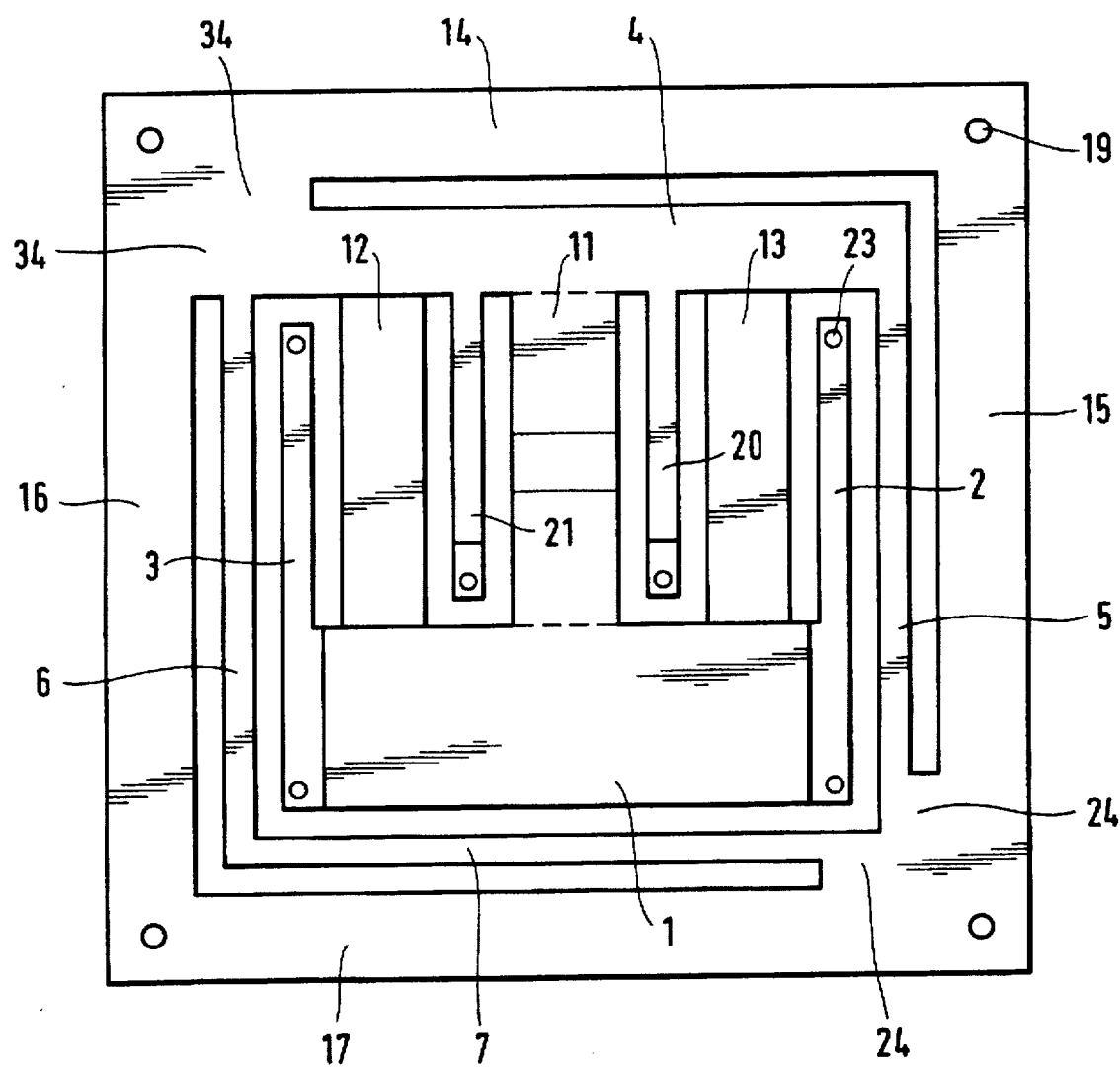
FIG. 7 shows a top view of the balance in a fifth embodiment.
Figure 8:
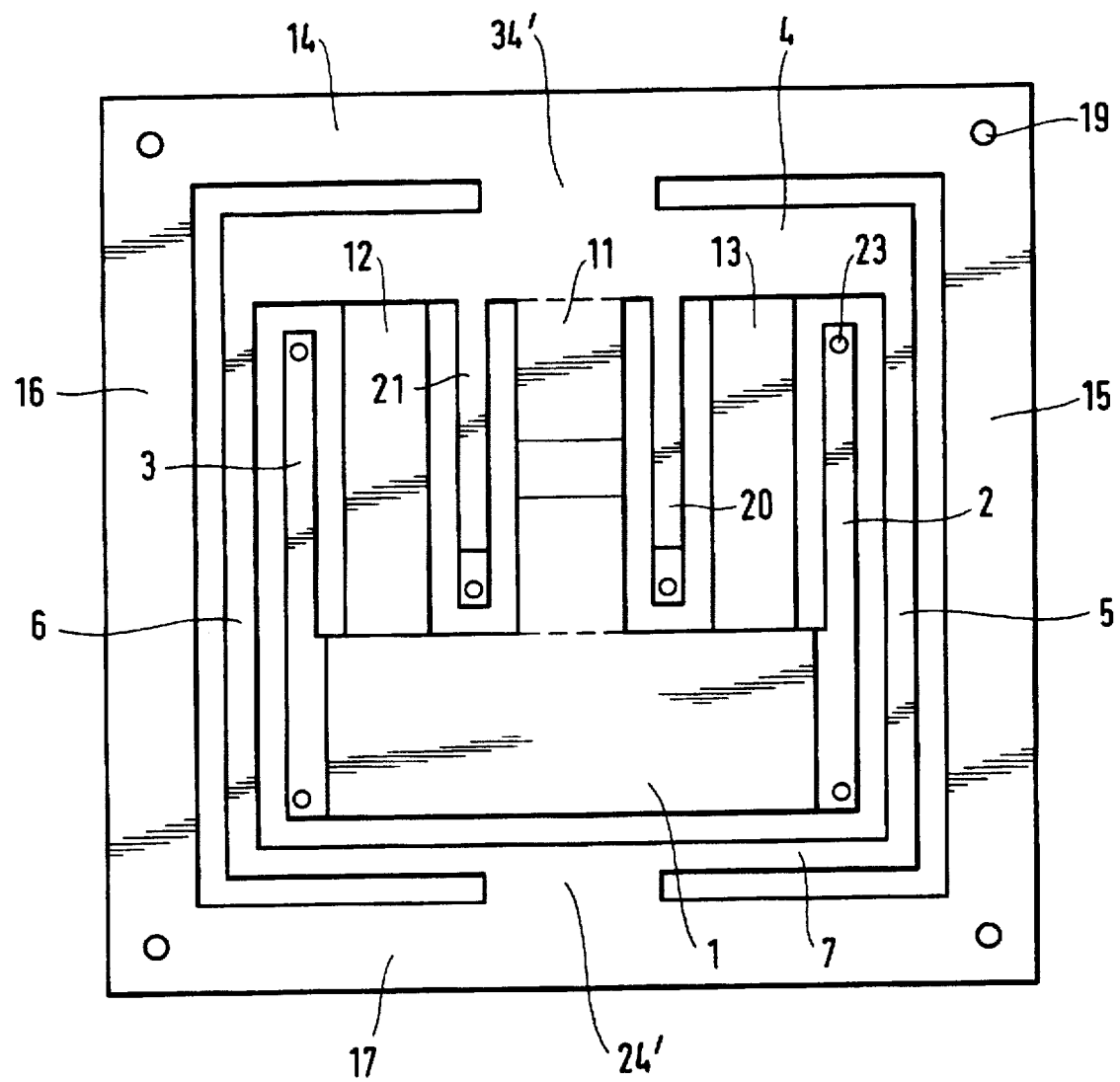
FIG. 8 shows a top view of the balance in a sixth embodiment.

FIGS. 7 and 8 show two further embodiments of the balance in a top view showing two alternative connections between the two frames. In FIG. 7 two intermediate pieces 24, 34 connect both frames 4,5,6,7 and 14,15,16,17. As a result of this double connection the tipping of inner frame 4,5,6,7 upon loading of the balance is considerably decreased. The coupling between the two frames becomes somewhat more rigid as a result thereof. However, both frames can continue to twist independently of one another so that the mutual influencing is held within limits.

In FIG. 8 the connection between the two frames also takes place by means of two intermediate pieces 24', 34', which are located, however, in this embodiment in the middle of two opposite sides. One of these two intermediate pieces 24'or 34' can of course also be eliminated if the decoupling between the inner and the outer frame should be stronger.

FIG. 9 shows a seventh embodiment in a top view. In this embodiment guide rods 111, 112, 113 of the parallel guide are arranged diagonally in rectangular inner frame 104, 105, 106, 107. Guide rod 111 is the upper guide rod and guide rods 112, 113 the lower guide rods. The guide rods connect load receiver 101 to triangular intermediate part 135 in inner frame 104, 105, 106, 107. A balance scale (not shown) is supported on load receiver 101 via three perforations 123. Inner frame 104, 105, 106, 107 is connected via intermediate piece 124 to outer frame 114, 115, 116, 117. Four perforations 119 for the balance feet (not shown) are present in outer frame 114, 115, 116, 117. Triangular intermediate piece 135 also carries two projections 120, 121 on which, as in the other embodiments, an electrode of a capacitive path scanning can be fastened. The other electrode is then formed e.g. by the large surface of load receiver 101. This embodiment with diagonally arranged guide rods has the advantage that the support areas of the guide rods, namely load receiver 101 and triangular intermediate piece 135, can be designed to be especially stable.

In all the embodiments described above the inner and the outer frame are designed to be rectangular. It is naturally also possible to design the two frames in a circular pattern and to connect them to one another at one or more locations with as little twisting as possible.

We claim:

1. In a toploaded balance having a load receiver (1,2,3) connected by at least one upper guide rod (11) and at least one lower guide rod (12, 13) in the form of a parallel guide to a system carrier fixed to the housing, which upper and lower guide rods and system carrier are manufactured from one piece, wherein the system carrier comprises a substantially rectangularly shaped inner frame (4,5,6,7), the said inner frame is completely surrounded by a substantially rectangularly shaped outer frame (14, 15, 16, 17) supported on balance feet, each of said frames has four corners and are connected to one another at only one corner each of the frames in such a manner that twistings of the one frame are transferred as little as possible onto the outer frame.

2. In a toploaded balance having a load receiver (1, 2, 3) connected by at least one upper guide rod (11) and at least one lower guide rod (12, 13) in the form of a parallel guide to a system carrier fixed to the housing, which upper and lower guide rods and system carrier are manufactured from one piece, wherein the system carrier comprises a substantially rectangularly shaped inner frame (4, 5, 6, 7), the said inner frame is completely surrounded by a substantially rectangularly shaped outer frame (14, 15, 16, 17) supported on balance feet, each of said frames has four corners and are connected to one another at only two oppositely disposed corners of each of the flames in such a manner that twistings of the one frame are transferred as little as possible onto the outer frame.

3. In a toploaded balance having a load receiver (1, 2, 3) connected by at least one upper guide rod (11) and at least one lower guide rod (12, 13) in the form of a parallel guide to a system carrier fixed to the housing, which upper and lower guide rods and system carrier are manufactured from one piece, wherein the system carrier comprises a substantially rectangularly shaped inner frame (4, 5, 6, 7), the said inner frame is completely surrounded by a substantially rectangularly shaped outer frame (14, 15, 16, 17) supported on balance feet, each of said frames has four corners and are connected to one another at only two adjacently disposed corners of each of the frames in such a manner that twistings of the one frame are transferred as little as possible onto the outer frame corner.

4. In a toploaded balance having a load receiver (1, 2, 3) connected by at least one upper guide rod (11) and at least one lower guide rod (12, 13) in the form of a parallel guide to a system carrier fixed to the housing, which upper and lower guide rods and system carrier are manufactured from one piece, wherein the system carrier comprises a substantially rectangularly shaped inner frame (4, 5, 6, 7), the said inner frame is completely surrounded by a substantially rectangularly shaped outer frame (14, 15, 16, 17) supported on balance feet, each of said frames has four sides and are connected to one another at only one approximately mid-point of a side of each frame in such a manner that twistings of the one frame are transferred as little as possible onto the outer frame.

5. In a toploaded balance having a load receiver (1, 2, 3) connected by at least one upper guide rod (11) and at least one lower guide rod (12, 13) in the form of a parallel guide to a system carrier fixed to the housing, which upper and lower guide rods and system carrier are manufactured from one piece, wherein the system carrier comprises a substantially rectangularly shaped inner frame (4, 5, 6, 7), the said inner frame is completely surrounded by a substantially rectangularly shaped outer frame (14, 15, 16, 17) supported on balance feet, each of said frames has four sides and are connected at the approximately mid-point of only two of oppositely disposed sides of each frame in such a manner that twistings of the one frame are transferred as little as possible onto the outer frame.

6. The toploaded balance according to one of claims 1, 2, 3, 4 or 5 wherein the inner frames has an upper guide rod (11) and a lower guide rod (12, 13).

7. The toploaded balance according to one of claims 1, 2, 3, 4 or 5 wherein the inner frames has a two part upper guide rod (11', 11") and a two part lower guide rod (12, 13).

8. The toploaded balance according to one of claims 1, 2, 3, 4 or 5 wherein one electrode of a capacitive path scanning is attached to the system carrier and another electrode of the capacitive path scanning is attached to the load receiver.

* * * * *